US008705526B1

(12) United States Patent
Hasan

(10) Patent No.: US 8,705,526 B1
(45) Date of Patent: Apr. 22, 2014

(54) EXTENDING VPLS SUPPORT FOR CE LAG MULTI-HOMING

(75) Inventor: Safaa S. Hasan, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 600 days.

(21) Appl. No.: 12/960,003

(22) Filed: Dec. 3, 2010

(51) Int. Cl.
*H04L 12/28* (2006.01)
*H04L 1/00* (2006.01)
*H04J 3/14* (2006.01)
*H04J 1/16* (2006.01)

(52) U.S. Cl.
USPC ........... 370/389; 370/216; 370/220; 370/225; 370/228; 370/229; 370/230.1; 370/235; 370/237; 370/400; 370/401

(58) Field of Classification Search
None
See application file for complete search history.

(56) References Cited

U.S. PATENT DOCUMENTS

| 2007/0288653 | A1* | 12/2007 | Sargor et al. ................. | 709/245 |
| 2009/0154339 | A1* | 6/2009 | Zi ............................... | 370/217 |
| 2009/0201937 | A1* | 8/2009 | Bragg et al. ................. | 370/401 |
| 2009/0274155 | A1* | 11/2009 | Nakash ....................... | 370/395.53 |
| 2010/0329110 | A1* | 12/2010 | Rose et al. .................... | 370/217 |
| 2011/0194404 | A1* | 8/2011 | Kluger et al. ................ | 370/218 |
| 2012/0131216 | A1* | 5/2012 | Jain et al. .................... | 709/230 |

OTHER PUBLICATIONS

U.S. Appl. No. 12/246,810, by Kireeti Kompella, filed Oct. 7, 2008.
Kothari et al., "BGP based Multi-homing in Virtual Private LAN Service," RFC 4761, Oct. 25, 2010, 28 pp.
Henderickx et al., "BGP based Multi-homing in Virtual Private LAN Service," IETF, draft-henderickx-12vpn-vpls-multihoming-00.txt, Mar. 4, 2009, 11 pp.

* cited by examiner

*Primary Examiner* — Hassan Phillips
*Assistant Examiner* — Lonnie Sweet
(74) *Attorney, Agent, or Firm* — Shumaker & Sieffert, P.A.

(57) ABSTRACT

Techniques are described for forwarding packets in a VPLS using multi-homing PE routers configured in an "active-active" link topology. As described herein, a PE router receives a packet from a multi-homed VPLS customer site, and processes the packet to determine a portion of a MAC domain to which the packet corresponds. When the packet is determined to correspond to a portion associated with the PE router, the PE router forwards the packet to the destination in accordance with forwarding protocols executing on the PE router. When the packet is determined to correspond to a portion associated with a second PE router, the PE router forwards the packet to the second PE router via a pseudowire that is external to the VPLS domain, and the second PE router forwards the packet to the destination in accordance with forwarding protocols executing on the second PE router.

23 Claims, 7 Drawing Sheets

EXTENDING VPLS SUPPORT FOR CE LAG MULTI-HOMING

TECHNICAL FIELD

This disclosure relates to computer networks and, more particularly, to connections established over computer networks.

BACKGROUND

Networks that primarily utilize data link layer devices are often referred to as layer two (L2) networks. A data link layer device is a device that operates within the second layer of the Open Systems Interconnection (OSI) reference model, i.e., the data link layer. One example of a common L2 network is an Ethernet network in which end point devices (e.g., servers, printers, computers, and the like) are connected by one or more Ethernet switches. The Ethernet switches forward Ethernet frames, also referred to as L2 communications or L2 packets to devices within the network. As the Ethernet switches forward the Ethernet frames, the Ethernet switches learn L2 state information for the L2 network, including media access control (MAC) addressing information for the devices within the network and the physical ports through which the devices are reachable. The Ethernet switches typically store the MAC addressing information in MAC tables. When forwarding an individual Ethernet frame, an ingress port of an Ethernet switch typically broadcasts the Ethernet frame to all of the other physical ports of the switch unless the Ethernet switch has learned the specific physical port through which the destination MAC address devices is reachable. In this case, the Ethernet switch forwards a single copy of the Ethernet frame out the associated physical port.

The term "link" is often used to refer to the connection between two devices on a network. The link may be a physical medium, such as a copper wire, a coaxial cable, any of a host of different fiber optic lines, or a wireless connection. In addition, network devices may define "virtual" or "logical" links, and map the virtual links to the physical links. In some cases, Ethernet links may be combined into one logical interface for higher bandwidth and redundancy. Ports of the Ethernet links that are combined in this manner are referred to as a link aggregation group (LAG) or bundle.

A virtual private local area network service (VPLS) is one example of an L2 virtual private network (VPN) service that may be used to extend two or more remote customer networks, i.e., VPLS sites, through an intermediate network (usually referred to as a provider network) in a transparent manner, i.e., as if the intermediate network does not exist and the remote customer networks are instead directly connected to one another. In particular, the VPLS transports L2 communications, such as Ethernet packets, between customer networks via the intermediate network. In a typical configuration, provider edge (PE) routers coupled to the customer networks operate as ingress and egress for label switched paths (LSPs) or other tunnels that may be used as pseudowires within the provider network to carry encapsulated L2 communications as if the customer networks were directly attached to the same local area network (LAN). These PE routers may be referred to as "members of the VPLS domain" in that they run a VPLS instance for the VPLS domain and maintain L2 state information for the VPLS service. The PE routers may use either Border Gateway Protocol (BGP) or Label Distribution Protocol (LDP) as the control plane protocol for signaling the VPLS service. While VPLS is an example of a multipoint-to-multipoint service, an L2 virtual circuit or pseudowire is an example of a point-to-point service that may be used to connect two remote customer networks.

In some cases, a customer network site may be given redundant connectivity to a network through multiple PE routers. This form of redundancy is referred to as "multi-homing." In multi-homing, one of the multiple PE routers coupled to the customer network is traditionally chosen as the active PE router, or designated forwarder, to send traffic to and from the customer network. The other one or more PE routers are designated as backup forwarders which can be used to send traffic to and from the customer network in the event of a network failure that would preclude the current designated forwarder from sending the traffic. As such, multi-homed deployments have traditionally utilized an "active-standby" link topology where the standby link is only used when the active link is disabled. The "active-standby" link topology avoids certain issues associated with a multi-homed deployment, e.g., packet duplicates, MAC moves, and loops, but may be wasteful of resources because only a single link is used to handle network traffic at any given time.

SUMMARY

The techniques described herein generally facilitate an "active-active" link topology in a multi-homed network where the traditional issues of packet duplicates, MAC moves, and loops are avoided. Rather than only one of the multi-homing PE routers operating as an active designated forwarder and all of the other multi-homing PE routers operating as standby or backup forwarders, all of the multi-homing PE routers in a multi-homed deployment can be made active concurrently. To avoid the traditional issues of packet duplicates, MAC moves, and loops, the multi-homed VPLS site MAC address space is distributed amongst all of the multi-homing PE routers associated with the VPLS site such that each of the multi-homing PE routers handles traffic associated with a particular portion of the VPLS site MAC address space.

In accordance with one embodiment, packets that are received by a multi-homing PE router are inspected to determine a portion of the MAC address space with which the packet is associated, e.g., based on the source or destination MAC address of the packet. If the receiving PE router is responsible for forwarding packets associated with that portion of the MAC address space, the receiving PE router handles the forwarding of the packet. Otherwise, the receiving PE router sends the packet to the multi-homing PE router that is responsible for forwarding packets associated with that portion of the MAC address, such that the responsible PE router may handle forwarding of the packet. As such, packet forwarding to and from a particular network device that resides within the multi-homed VPLS site is handled by a specific one of the multi-homing PE routers—i.e., the multi-homing PE router that is assigned to the particular MAC address space associated with the particular device. In this manner, duplicate packets, MAC moves, and loops are avoided even though the multi-homed VPLS site utilizes an "active-active" link topology.

The details of one or more embodiments are set forth in the accompanying drawings and the description below. Other features, objects, and advantages will be apparent from the description and drawings, and from the claims.

DETAILED DESCRIPTION

FIGS. 1A-1D are block diagrams illustrating an example system 8 in which the address space of a multi-homed VPLS site is distributed amongst a plurality of multi-homing PE routers in accordance with the techniques of this disclosure. Example system 8 includes a service provider (SP) network 10 that connects a number of network devices. The network devices in system 8 are configured to provide VPLS services to VPLS sites 14A-14C ("VPLS sites 14"). A VPLS may be used to extend two or more remote customer networks, e.g., VPLS sites 14, through SP network 10 in a transparent manner, as if SP network 10 does not exist. In particular, the VPLS transports layer two (L2) communications, such as Ethernet packets, between one or more host devices 12A-12D ("host devices 12") within VPLS sites 14 via SP network 10. In a typical configuration, provider edge (PE) routers 16 are coupled to the customer networks by customer edge (CE) routers 18A-18C ("CE routers 18"). Although shown for purposes of example as CE routers, PE routers 16 may in some examples be coupled to VPLS sites 14 by other devices, such as network switches. PE routers 16 define label switched paths (LSPs) that may be used as VPLS pseudowires within SP network 10 to carry encapsulated L2 communications as if the customer networks were directly attached to the same local area network (LAN). In BGP-based VPLS networks, BGP is used as the control plane protocol for signaling the VPLS service, but it should be understood that other appropriate protocols may also be used. PE routers 16 that participate in the BGP-based VPLS signaling and maintain L2 state information for the customer sites may be referred to as "members of the VPLS domain." In the example of FIG. 1A, VPLS pseudowire (PW) 20A is established to carry communications between PE router 16A and PE router 16B, VPLS PW 20B is established to carry communications between PE router 16A and 16C, and VPLS PW 20C is established to carry communications between PE router 16B and PE router 16C. VPLS PWs 20 may be bi-directional pseudowires. For example, VPLS PW 20A may include a PW from PE router 16A to PE router 16B as well as a PW from PE router 16B to PE router 16A.

Figure 1A:
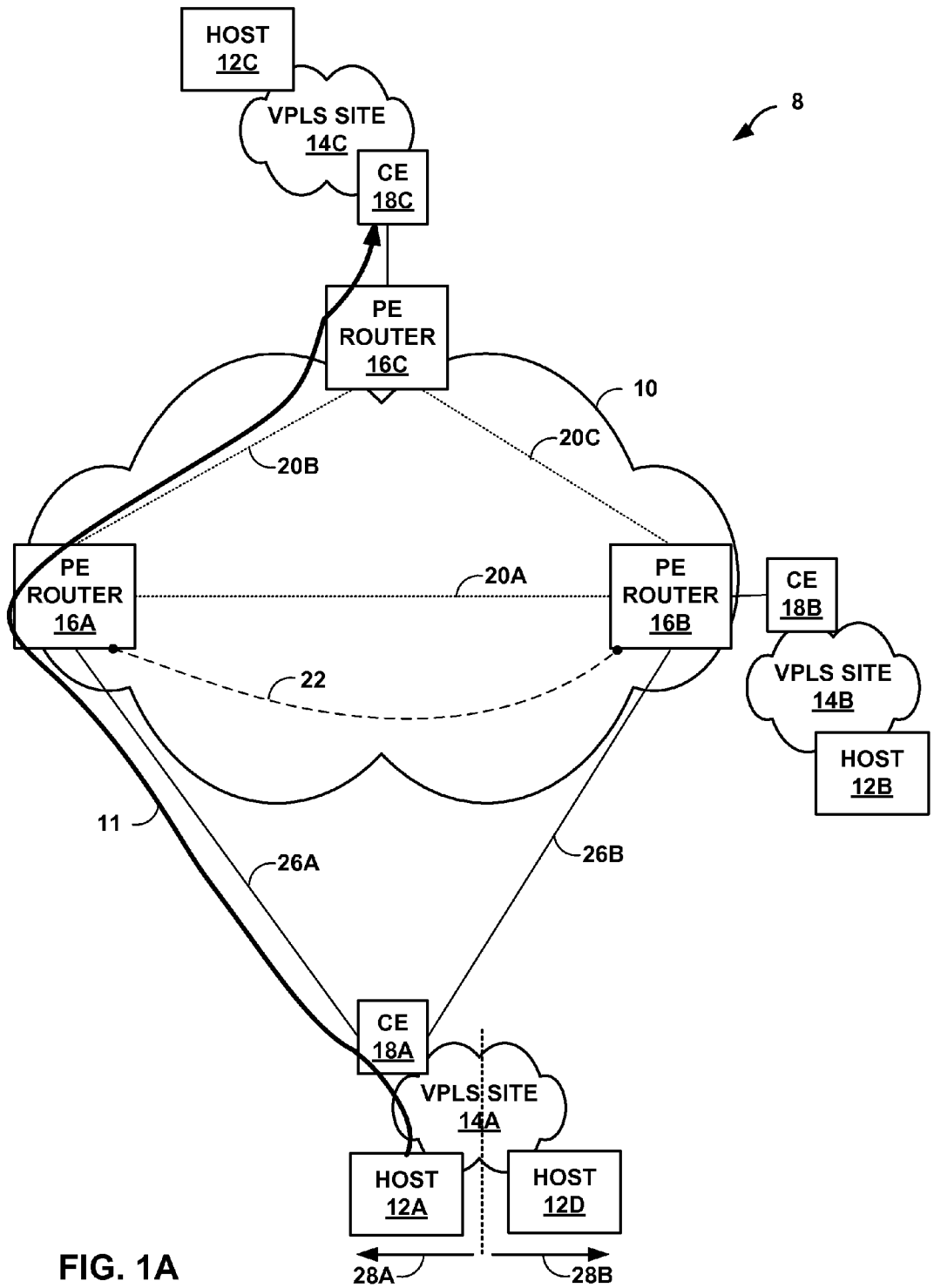
FIGS. 1A-1D are block diagrams illustrating an example system in which the address space of a multi-homed VPLS site is distributed amongst a plurality of multi-homing PE routers in accordance with the techniques of this disclosure.

In the example of FIG. 1A, VPLS site 14A has redundant physical connectivity to SP network 10 through multiple PE routers 16 via links 26A and 26B, a technique which is referred to as "multi-homing." Specifically, VPLS site 14A, via CE router 18A, is multi-homed to SP network 10 through PE routers 16A and 16B. Additional details related to multi-homing in BGP-based VPLS can be found in K. Kompella, "Multi-homing in BGP-based Virtual Private LAN Service," draft-kompella-l2vpn-vpls-multihoming-02.txt, IETF Internet Draft 4761, November 2008, which is hereby incorporated by reference in its entirety.

In traditional multi-homing implementations, one of the PE routers, e.g., PE router 16A, is chosen to be the active PE router, or designated forwarder, to send traffic to and from the customer network. The other multi-homing PE router, e.g., PE router 16B, is designated as a backup forwarder which can be used to send traffic to and from the customer network in the event of a network failure that would preclude the current designated forwarder from sending the traffic. As such, traditional multi-homing implementations utilize an "active-standby" link topology where the standby link is only used when the active link is disabled.

The traditional "active-standby" link topology may be wasteful of network resources because only a single link is used to handle network traffic at any given time. In accordance with the techniques of this disclosure, network resources may be more fully utilized through the use of an "active-active" link topology where all of the multi-homing PE routers in a multi-homed deployment are made active. To avoid the traditional issues of packet duplicates, MAC moves, and loops, the multi-homed VPLS site MAC address space may be distributed amongst all of the multi-homing PE routers associated with the VPLS site such that each of the multi-homing PE routers handles traffic associated with only a particular portion of the VPLS site MAC address space. As such, packet forwarding to and from a particular network device that resides within the multi-homed VPLS site is handled by a specific one of the multi-homing PE routers—i.e., the multi-homing PE router that is assigned to the particular MAC address space associated with the particular device.

To provide the "active-active" link topology described above, a MAC interface on the customer-facing side of the multi-homing PE routers may be used to access member links in an active-active link members mode. The MAC interface may be replicated over each of the multi-homing PE routers, and network traffic may be forwarded over the interface in a controlled manner that avoids MAC moves, loops, and duplicate packets being sent to a CE. The MAC interface and associated forwarding rules are described in greater detail below.

VPLS sites 14 may each have a MAC domain or address space that includes the MAC addresses of host devices 12 in each of the respective VPLS sites 14. According to the techniques of this disclosure, the MAC domain of a multi-homed VPLS site, e.g., VPLS site 14A, may be divided into two or more mutually exclusive portions, such that each portion of the network traffic is handled by a specific one of the multi-homing PE routers 16 connected to the multi-homed VPLS site. The division of the MAC domain is represented in FIG. 1A as a dashed line dividing VPLS site 14A into two portions, a first portion 28A and a second portion 28B. If PE router 16A is responsible for handling network traffic associated with the first portion 28A of the MAC domain of VPLS site 14A, network traffic destined for or received from host device 12A, which is within the first portion 28A of the MAC domain, may be forwarded by PE router 16A. Similarly, if PE router 16B is responsible for handling network traffic associated with the second portion 28B of the MAC domain of VPLS site 14A, network traffic destined for or received from host device 12D, which is within the second portion 28B of the MAC domain, may be forwarded by PE router 16B.

The MAC domain of a VPLS site may be divided into any number of distinct portions. In one implementation, the number of portions into which the MAC domain is divided may equal the number of multi-homing PE routers 16 connected to the VPLS site. For example, in the case shown in FIG. 1A, the MAC domain is divided into two portions, which correspond to the two multi-homing PE routers 16A and 16B. In such an example, the MAC domain may be divided such that a first PE router, e.g., PE router 16A, may handle all network traffic to or from odd MAC addresses, and a second PE router, e.g., PE router 16B, may handle all network traffic to or from even MAC addresses. Therefore, to determine which PE router is designated to handle a particular packet, the PE router that receives the packet can examine the source or destination MAC address of the packet and in particular the last bit of the MAC address. Packets having odd MAC addresses may then be handled by PE router 16A, while packets having even MAC addresses may be handled by PE router 16B. The MAC domain may also be separated using other approaches. For example, a MAC domain that is divided into two portions may also be separated according to a median MAC address value, where the first portion includes all of the MAC addresses that are less than the median MAC address value, and the second portion includes all of the MAC addresses greater than or equal to the median MAC address value. In other implementations, the MAC domain may be apportioned in different manners, such as MAC domain portions that correspond to a particular type of network device (e.g., all network printing devices may be included in one portion, while network storage devices may be included in another portion). In such examples, multiple MAC domain portions may be assigned to be handled by a single PE router.

In some implementations, the MAC domain may be split relatively evenly, such that each of the PE routers is assigned to handle traffic to and from an approximately equal number of network devices. In other implementations, the MAC domain may be split into disparate portions. Some example cases for splitting a MAC domain in a disparate manner may be to provide equal load balancing where it is known that certain network devices generate a disproportionate amount of network traffic, or to provide intentionally disproportionate load balancing amongst the multi-homing PE routers, for example.

Multi-homing PE routers 16A and 16B may be manually configured, e.g., by an administrator of SP network 10, to define the division of the MAC domain of VPLS site 14A into two or more portions. In other implementations, PE routers 16A and 16B may automatically negotiate the division of the MAC domain. In one example of such an implementation, PE routers 16A and 16B may perform the negotiations for the MAC domain division using customized type-length-value (TLV) fields within routing protocol messages, e.g., BGP communications, where the TLVs are used to communicate that a PE router is capable of operating in an "active-active" mode, and may also include information about how the MAC domain will be divided. For example, upon configuring the MAC interface on the PE router, the PE router may advertise its support of the MAC interface and "active-active" link topology to other multi-homing PE routers using TLVs, and information included in the TLVs may be used to determine how the MAC domain should be split amongst the participating PE routers.

Once it has been established how the MAC domain will be divided amongst the participating PE routers, pseudowires that are external to the VPLS, e.g., PW 22, may be established between the participating multi-homing PE routers to carry network traffic to the multi-homing PE router that is responsible for forwarding the traffic to the VPLS. In the example of FIG. 1A, PW 22 is established to carry network traffic between PE router 16A and PE router 16B. In some implementations, PW 22 may be bi-directional, e.g., PW 22 may include a PW from PE router 16A to PE router 16B as well as a PW from PE router 16B to PE router 16A.

In some implementations, additional PWs external to the VPLS may be established between the multi-homing PE routers. For example, a first set of PWs may be used for forwarding ingress VPLS traffic received at the PE router from the local VPLS site and destined for a remote VPLS site, while a second set of PWs may be used for forwarding egress VPLS traffic that has been received at the PE router from the core and is destined for the local VPLS site. The first set of PWs may be referred to herein as ingress PWs, while the second set of PWs may be referred to herein as egress PWs. The egress PWs from a multi-homing PE router may be cross-connected at the other multi-homing PE router to the local link to carry traffic to the remote PE router link, and the ingress PWs may be terminated in the remote PE router VPLS. Some implementations may utilize both the first and second sets of PWs, while other implementations may utilize either the first set of PWs or the second set of PWs.

In implementations utilizing both sets of PWs, the MAC interface for the multi-homing PE routers may be created as follows. The transmit side of the local member link and all of the egress PWs may be logically bundled to represent the transmit side of the MAC interface. The receive side of the local member link and all of the ingress PWs may be logically bundled to represent the receive side of the MAC interface. The egress end of the egress PW may be cross-connected to the transmit path of the local member link at the remote PE router, and any traffic received over the egress PW may be pushed to the member link. In other words, each PE router may have full receive and transmit access to all member links. As described above, the source MAC address of packets received over any link member of the multi-homing PE routers will match either the MAC domain portion of the receiving PE router or one of the other multi-homing PE routers. The packet may then be forwarded accordingly, either to the local PE router VPLS if the MAC address matches the MAC domain portion of the receiving PE router, or to the appropriate one of the other multi-homing PE routers over the associated ingress PW if the MAC address does not match the MAC domain portion of the receiving PE router.

When a multi-homing PE router, e.g., PE router 16A, receives a packet destined for a remote VPLS site, the PE router may inspect the source MAC address of the packet to determine which of the multi-homing PE routers is responsible for forwarding the packet to the VPLS. As one example, PE router 16A may hash the source MAC address of the packet to determine whether PE router 16A or PE router 16B is responsible for handling the packet. If PE router 16A is responsible for injecting the packet into the VPLS cloud, PE router 16A may forward the packet to the VPLS in accordance with its forwarding protocols. If PE router 16A determines that the other multi-homing PE router 16B is responsible for forwarding the packet to the VPLS, then PE router 16A may forward the packet to the other multi-homing PE router 16B over a non-VPLS pseudowire, e.g., PW 22, and the other multi-homing PE router 16B may then forward the packet to the VPLS in accordance with its forwarding protocols. Similar procedures may be applied with respect to inspecting the destination MAC addresses of packets received from the core that are destined for the local VPLS site.

Paths 11 shown in FIGS. 1A-1D illustrate the path of network traffic that is forwarded from host devices within a first VPLS site 14A to host devices within a second VPLS site 14C in accordance with the techniques described herein. In FIG. 1A, host device 12A has a MAC address that is associated with a first portion 28A of the MAC domain of VPLS site 14A. In the example, PE router 16A is responsible for forwarding packets from the first portion of the MAC domain. As such, when PE router 16A receives a packet over link 26A originating from host device 12A, PE router 16A inspects the packet and determines that it is responsible for forwarding the packet to the VPLS. Then, PE router 16A forwards the packet to PE router 16C over VPLS PW 20B, and PE router 16C forwards the packet to CE 18C.

Figure 1B:
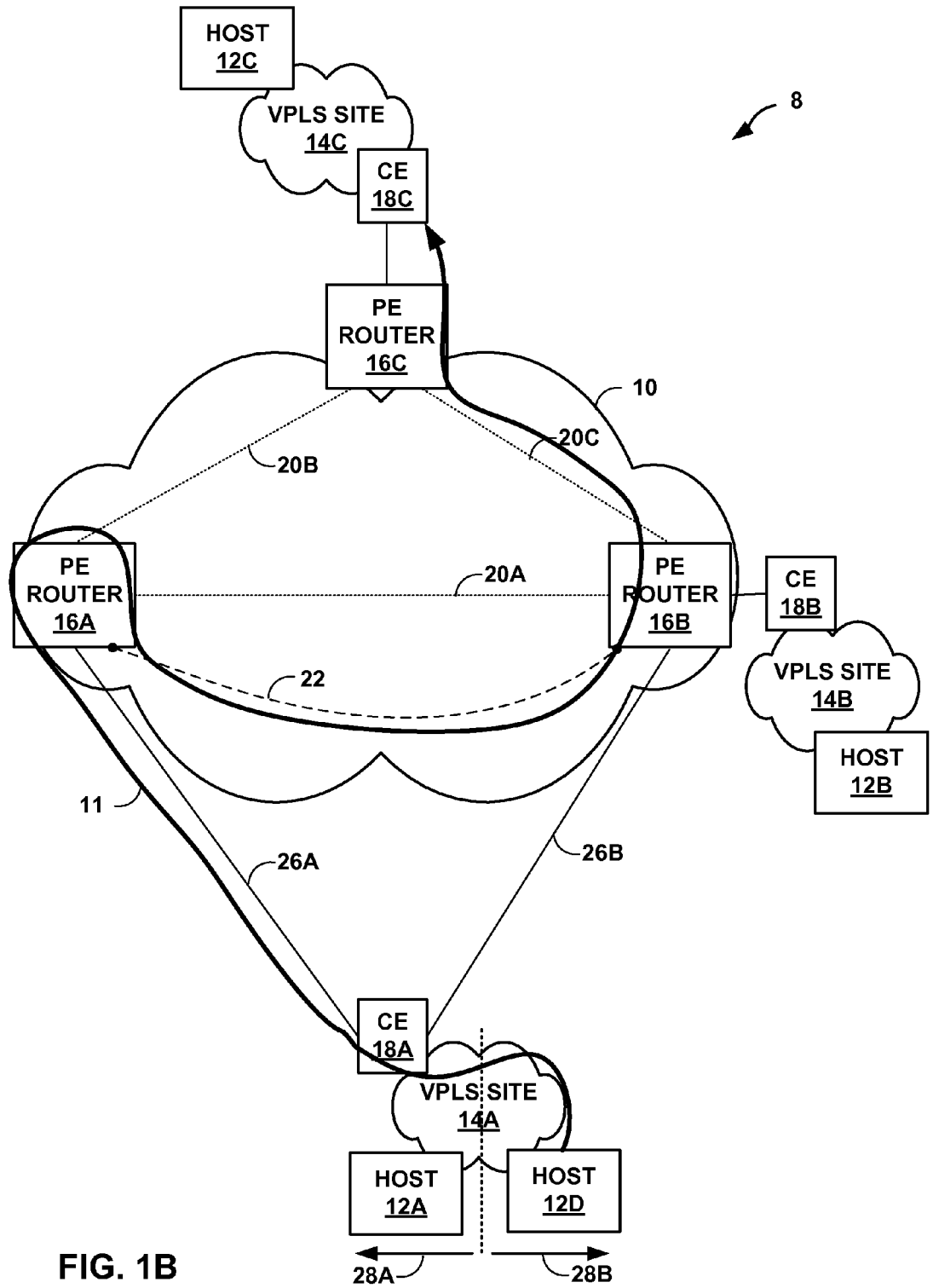
Figure 1C:
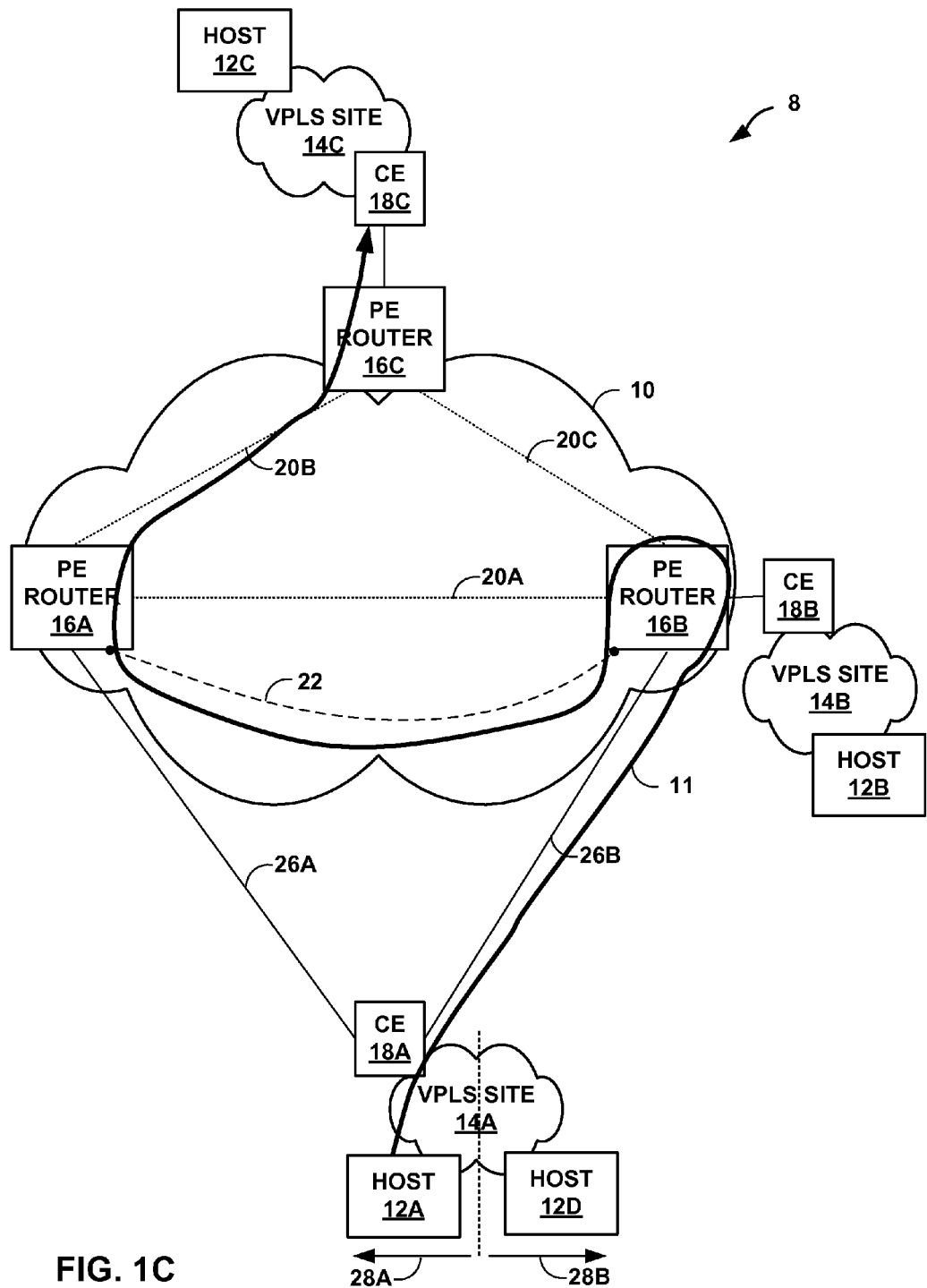
Figure 1D:
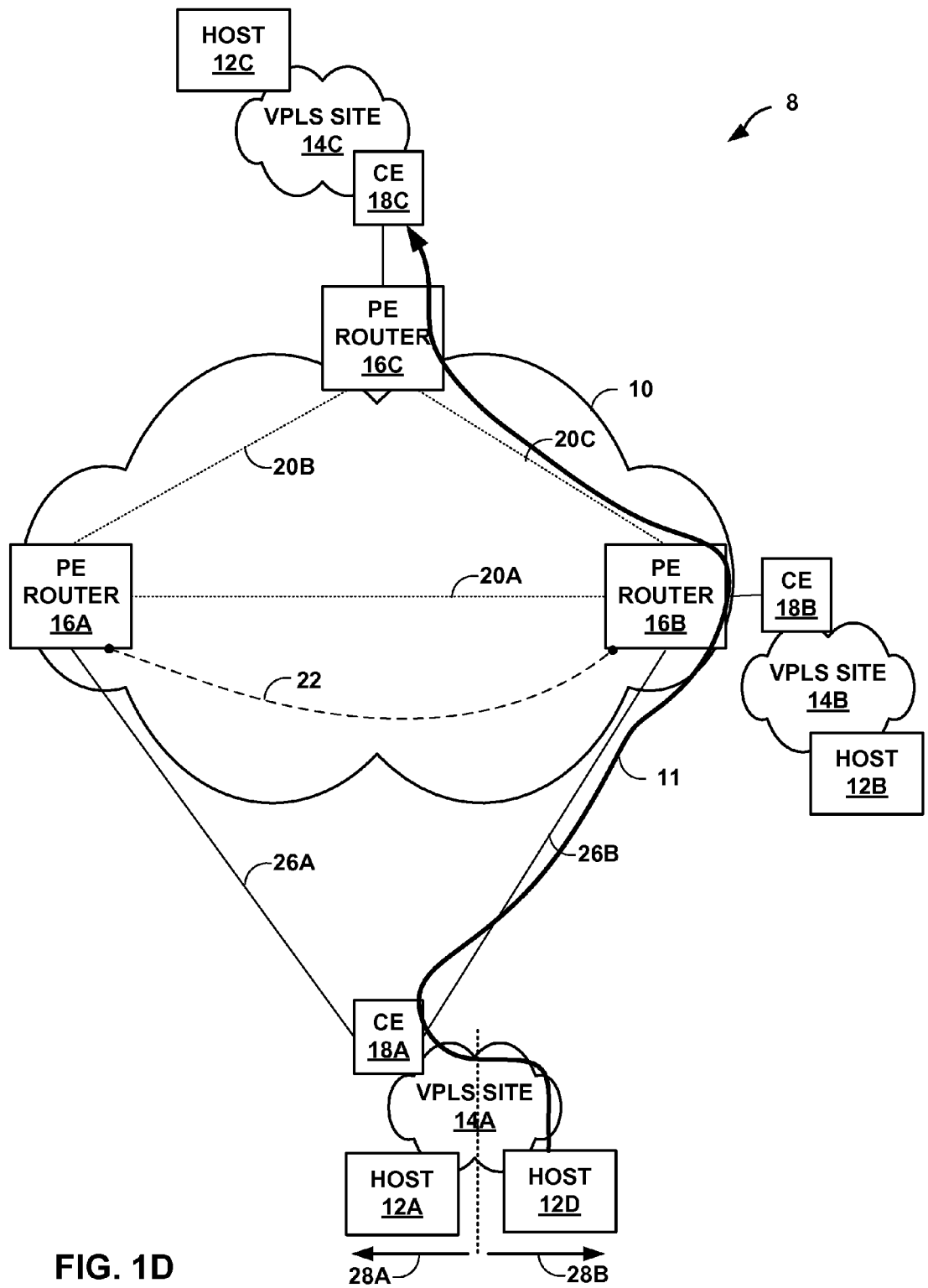

In FIG. 1B, host device 12D has a MAC address that is associated with a second portion 28B of the MAC domain of VPLS site 14A. In the example, PE router 16B is responsible for forwarding packets from the second portion of the MAC domain. As such, when PE router 16A receives a packet over link 26A originating from host device 12D, PE router 16A inspects the packet and determines that PE router 16B is responsible for forwarding the packet to the VPLS. As such, PE router 16A forwards the packet to PE router 16B over non-VPLS PW 22, and PE router 16B then forwards the packet to the VPLS. In particular PE router 16B forwards the packet to PE router 16C over VPLS PW 20C, and PE router 16C forwards the packet to CE 18C.

In FIG. 1C, host device 12A again has a MAC address that is associated with a first portion 28A of the MAC domain of VPLS site 14A. In the example, PE router 16A is responsible for forwarding packets from the first portion of the MAC domain. As such, when PE router 16B receives a packet over link 26B originating from host device 12A, PE router 16B inspects the packet and determines that PE router 16A is responsible for forwarding the packet to the VPLS. As such, PE router 16B forwards the packet to PE router 16A over non-VPLS PW 22, and PE router 16A then forwards the packet to the VPLS. In particular PE router 16A forwards the packet to PE router 16C over VPLS PW 20B, and PE router 16C forwards the packet to CE 18C.

In FIG. 1D, host device 12D again has a MAC address that is associated with a second portion 28B of the MAC domain of VPLS site 14A. In the example, PE router 16B is responsible for forwarding packets from the second portion of the MAC domain. As such, when PE router 16B receives a packet over link 26B originating from host device 12D, PE router 16B inspects the packet and determines that it is responsible for forwarding the packet to the VPLS. Then, PE router 16B forwards the packet to PE router 16C over VPLS PW 20C, and PE router 16C forwards the packet to CE 18C.

Network traffic that is received from the core and destined for devices in multi-homed VPLS site 14A may be handled in a similar manner using the egress PWs that are external to the VPLS that are described above. For example, when PE router 16A receives a packet from the core that is destined for host device 12D, which has a MAC address in the second portion 28B of the MAC domain, PE router 16A inspects the destination MAC address of the packet and determines that PE router 16B is responsible for forwarding the packet to VPLS site 14A. As such, PE router 16A forwards the packet to PE router 16B over a non-VPLS PW (e.g., the egress PW between PE router 16A and PE router 16B), and PE router 16B may then forward the packet to local VPLS site 14A over active link 26B. In a similar manner, PE router 16A may forward a packet received from the core having a destination MAC address associated with the first portion 28A of the MAC domain to local VPLS site 14A over active link 26A.

In some instances, a PE router may be associated with both a multi-homed VPLS site and a single-homed VPLS site. For example, PE router 16B is associated with multi-homed VPLS site 14A and is also associated with single-homed VPLS site 14B. In such cases, the PE router may handle traffic received from the single-homed VPLS site in a traditional manner. In other words, when PE router 16B receives a packet from CE router 18B that is destined for a remote VPLS site, e.g., VPLS site 14C, PE router 16B forwards the packet to PE router 16C over VPLS PW 20C.

The above examples assume that both of the active links 26A and 26B are operational. However, as with the traditional "active-standby" link topology, situations may occur where one of the links fails or is otherwise made unavailable. In such a situation, the techniques described herein support failure protection using known fast re-route (FRR) processes. As described above, the MAC interface includes a logical bundle of the physical local link and one or more PWs. Upon a detected failure of the physical local link, the multi-homing PE router may maintain a hashing key that defines the portion of the MAC domain for which the PE router is responsible. When core traffic is received at the PE router for which the PE router would otherwise be responsible for handling, the PE router may re-route the traffic, e.g., utilizing FRR processes, to be distributed over any of the available PWs of the MAC interface.

The above routing procedures generally relate to known unicast packets destined for a remote VPLS site, e.g., VPLS site 14C, that are received at one of the multi-homing PE routers from the local VPLS site 14A. Other types of network traffic may also be received at the multi-homing PE routers, and the network traffic may be received from different network devices than those described above. In these cases, the network traffic may be handled according to a set of rules defined by the multi-homing PE routers. In some implementations, the rules defining how network traffic is to be handled are dependent on the type of traffic involved as well as the network device from which the traffic was received.

For example, when network traffic is received from the local VPLS site, e.g., VPLS site 14A, over a physical link, e.g., link 26A, PE router 16A may first classify the packet. For example, PE router may identify whether the packet is a known unicast packet, a broadcast, unknown unicast, and multicast (BUM) packet, or a broadcast/multicast (B/M) packet. Known unicast packets may be handled as described above. Namely, if the source MAC address of the packet matches the local MAC hashing key, the receiving PE router 16A may forward the known unicast packet to the VPLS over VPLS PWs. If the source MAC address of the packet matches the MAC hashing of another PE router, the receiving PE router 16A may forward the known unicast packet to the appropriate multi-homing PE router, e.g., PE router 16B, over a non-VPLS PW, e.g., an ingress PW. When the multi-homing PE router 16A receives BUM packets, the packets may be flooded to other PE routers in the VPLS, e.g., PE routers 16B and 16C.

When network traffic is received from the core, e.g., over VPLS or non-VPLS PWs, PE router 16A may similarly classify the packet into known unicast packets, BUM packets, and/or B/M packets. B/M packets that are received from any of the other multi-homing PE routers may be dropped rather than being forwarded to the MAC interface to prevent a loop through the member links. When a multi-homing PE router receives BUM packets from non-multi-homing PE routers, the destination MAC address of the packet may be hashed over the list of the multi-homing PE routers' PWs, and only the packets that match the local multi-homing PE router may be forwarded through the MAC interface (i.e., non-matching packets are not forwarded over the MAC interface). This may ensure that only one copy of the BUM traffic is forwarded to the local CE router. When the multi-homing PE router receives known unicast packets towards the MAC interface, the packets may be forwarded without MAC hashing, and forwarded to the local VPLS site 14A.

The forwarding rules described above are examples provided for illustrative purposes only, and it should be understood that other forwarding rules may be implemented in system 8. While the above rules provide efficient routing of packets to and from a local multi-homed VPLS site via two or more multi-homing PE routers, other implementations may utilize different rules that are also consistent with the techniques described herein.

The above examples describe a steady-state of system 8 that occurs when the multi-homing PE routers have already joined an existing MAC interface. However, when multi-homing PE routers are either joining or leaving the MAC interface, a transitional state may occur during which duplicate packets and loops may be created if appropriate procedures are not defined. As such, example procedures associated with multi-homing PE routers joining and leaving the MAC interface are described below.

In the case of a new PE router joining the MAC interface, the new PE router may announce its join, e.g., through LDP or BGP, to all of the multi-homing PE routers that are current members of the MAC family. After announcing its join, the new PE router may consider itself as part of the MAC family while the other multi-homing PE routers are still processing the new PE router join request. In the absence of the join procedures described below, multicast packets that are received by the new PE router from the local VPLS site during the transition period may be flooded to the other multi-homing PE routers, and the multi-homing PE routers may forward the multicast packets back to the CE of the local VPLS site over local member links, thereby causing a loop.

To address such a situation, after announcing its join, the new PE router may enforce a delay in activating its local member link of the MAC interface. Packets received by the new PE router that match the MAC address hashing of the new PE router are forwarded over the egress PWs, and such packets will be dropped by the other multi-homing PE routers during the transitional state, e.g., until the multi-homing PE routers have activated the addition of the new PE router into the MAC family. Forwarding over the ingress PWs may be activated immediately upon the announcement of the join or soon thereafter.

Upon receipt of the join message from the new PE router, the existing multi-homing PE routers may start to establish the MAC PWs and cross-connect the new PE router's PWs as well as activating new hashing to take into account the new MAC member. For example, the multi-homing PE routers may automatically negotiate the division of the MAC domain over the existing multi-homing PE routers as well as the new PE router. After the multi-homing PE routers have finished adding the new PE router as a MAC member, the new hashing may begin to be applied across all members of the MAC interface. Once the new PE router has been added as a new MAC member, the new PE router may activate its local link member. Because it is recognized as a part of the MAC family before activating the local link member, loops and traffic drops may be avoided.

Similar procedures may be implemented for avoiding traffic loss during MAC leaves. For example, before an existing PE router announces its leave, the leaving PE router may drop down its member link and move into a FRR state as described above. The leaving PE router may flush its learned MAC tables over the MAC interface and may stop learning from the MAC interface, e.g., for packets that are still forwarded from multi-homing PE routers over an ingress PW. The leaving PE router may continue forwarding traffic on its egress and ingress PWs, and the other multi-homing PE routers may forward such traffic in cross-connect until the other multi-homing PE routers finish removing the leaving PE router from the MAC family. At such time, the other multi-homing PE routers may block traffic to and from the MAC PWs to the leaving PE router. At the end of the delay, the leaving PE router can remove the MAC interface and stop forwarding over the MAC PWs.

Figure 2:
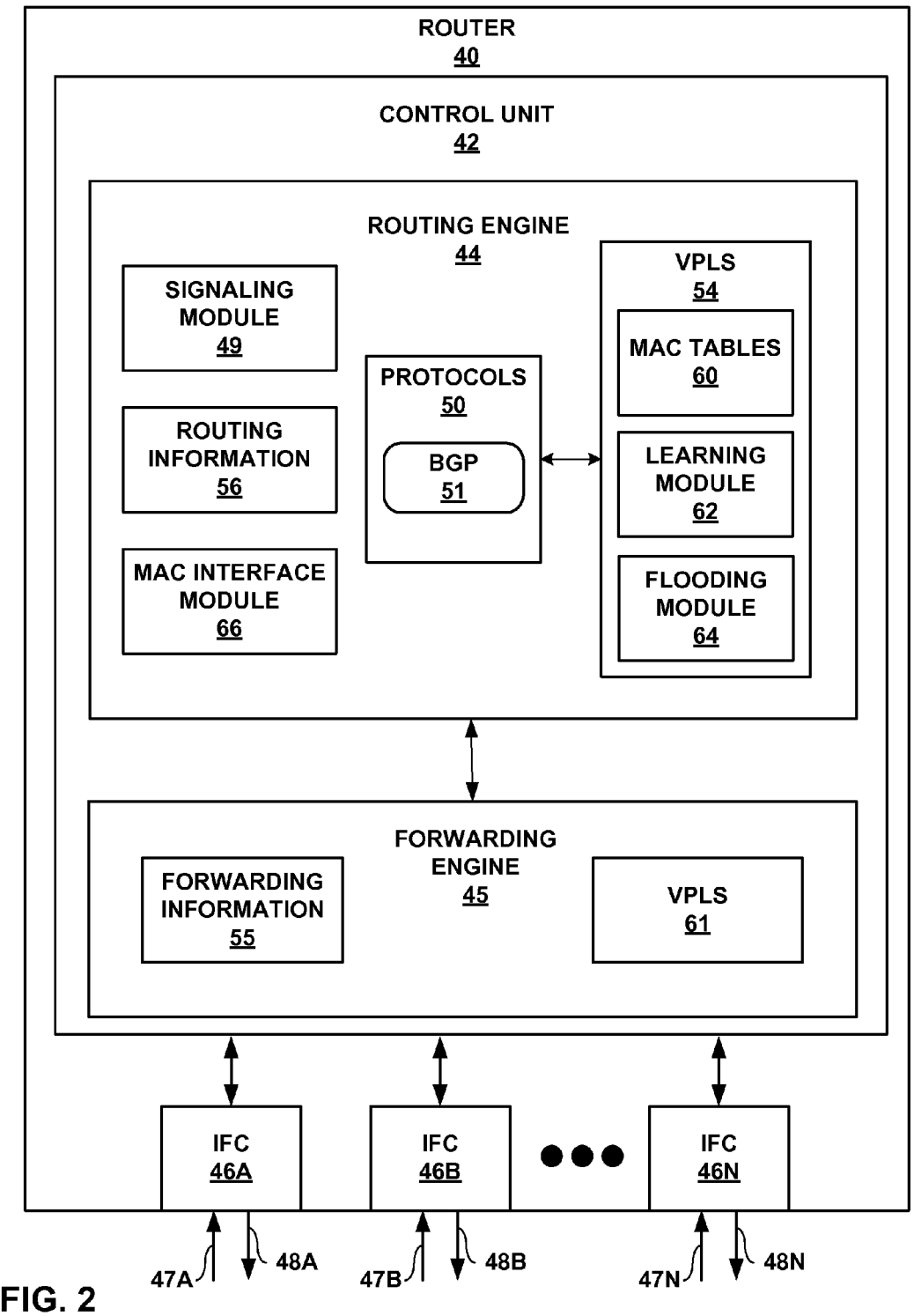
FIG. 2 is a block diagram illustrating an example router configured to participate in an "active-active" link topology in a multi-homed network in accordance with the techniques described herein.

FIG. 2 is a block diagram illustrating an example router 40 configured to participate in an "active-active" link topology in a multi-homed network in accordance with the techniques described herein. For example, router 40 may comprise any of routers 16 of FIG. 1. Router 40 includes a control unit 42 that includes a routing engine 44 coupled to a forwarding engine 45. Router 40 includes interface cards 46A-46N ("IFCs 46") that receive packets via inbound links 47A-47N ("inbound links 47") and send packets via outbound links 48A-48N ("outbound links 48"). IFCs 46 are typically coupled to links 47, 48 via a number of interface ports (not shown). Inbound links 47 and outbound links 48 may represent physical interfaces, logical interfaces, or some combination thereof.

Routing engine 44 provides an operating environment for various protocols 50 that execute at different layers of a network stack. The protocols may be software processes executing on one or more processors. For example, routing engine 44 includes network protocols that operate at a network layer of the network stack. In the example of FIG. 2, network protocols include the Border Gateway Protocol (BGP) 51, which is a routing protocol. Routing engine 44 may include other protocols not shown in FIG. 2. Routing engine 44 is responsible for the maintenance of routing information 56 to reflect the current topology of a network and other network entities to which router 40 is connected. In particular, routing protocols periodically update routing information 56 to accurately reflect the topology of the network and other entities based on routing protocol messages received by router 40.

Forwarding engine 45 represents hardware and logic functions that provide high-speed forwarding of network traffic. Forwarding engine 45 typically includes a set of one or more forwarding chips programmed with forwarding information that maps network destinations with specific next hops and the corresponding output interface ports. In general, when router 40 receives a packet via one of inbound links 47, forwarding engine 45 identifies an associated next hop for the data packet by traversing the programmed forwarding information based on information within the packet. Forwarding engine 45 forwards the packet on one of outbound links 48 mapped to the corresponding next hop.

In the example of FIG. 2, forwarding engine 45 includes forwarding information 55. In accordance with routing information 56, forwarding engine 45 maintains forwarding information 55 that associates network destinations with specific next hops and corresponding interface ports. For example, routing engine 44 analyzes routing information 56 and generates forwarding information 55 in accordance with routing information 56. Forwarding information 55 may be maintained in the form of one or more tables, link lists, radix trees, databases, flat files, or any other data structures.

Forwarding engine 45 maintains forwarding information 55 for each VPLS instance established by router 40 to associate network destinations with specific next hops and the corresponding interface ports. In general, when router 40 receives a data packet on a pseudowire of a given VPLS via one of inbound links 47, forwarding engine 45 identifies an associated next hop for the data packet by traversing forwarding information 55 based on information (e.g., labeling information) within the packet. Forwarding engine 45 forwards the data packet on one of outbound links 48 to the corresponding next hop in accordance with forwarding information 55 associated with the VPLS instance. At this time, forwarding engine 45 may push and/or pop labels from the packet to forward the packet along a correct pseudowire.

Control unit 42 also includes a VPLS module 54 having flooding module 64 that performs flooding and a learning module 62 that performs layer two (L2) learning, e.g., learning of customer device MAC addresses from inbound PWs and association of those customer MAC addresses with corresponding outbound PWs and output interfaces. VPLS module 54 may maintain MAC tables 60 for each VPLS instance established by router 40. Learning module 62 and flooding module 60 may alternatively reside within forwarding engine 45.

Signaling module 49 outputs control-plane messages to automatically establish VPLS pseudowires between router 40 and each of the other PE routers in the VPLS based on a location table associated with the VPLS. Signaling module 49 may signal the PE routers using a label distribution protocol, such as the Label Distribution Protocol (LDP). Signaling module 49 then communicates with VPLS module 61 of forwarding engine 45 to automatically update a pseudowire table associated with the VPLS within VPLS module 61.

VPLS module 61 executes in the data plane of router 40 and performs MAC address learning to automatically update portions of forwarding information 55 for each VPLS instance established by router 40. As part of forwarding engine 45, VPLS module 61 is invoked when router 40 receives data packets on the pseudowires (PWs) established by router 40 for any of the PE routers that are members of the VPLS. VPLS module 61 performs MAC address learning and updates the one of MAC tables 60 associated with the VPLS instance to initially record associations between the PWs connected to router 40 and the source MAC addresses of the VPLS customer devices from which the data packets were received on the PWs. For example, the one of MAC tables 60 records PW numbers that identify the PWs connected to router 40, and records MAC addresses that identify the source customer devices of the data packets transmitted over the PWs. In effect, router 40, an L3 routing device, learns associations between MAC addresses and pseudowires (which are mapped to ports), much as an L2 switch learns associations between MAC addresses and ports. Forwarding information 55 may represent a virtual port binding and bridging table. In this sense, the router is acting as a virtual L2 switch to provide VPLS service.

In order to update the one of the MAC tables 60, learning module 62 of VPLS module 54 in routing engine 44 performs L2 learning and association of L2 customer MAC addresses with specific PWs. Learning module 62 then communicates information recorded in the one of MAC tables 60 that is associated with the VPLS instance to VPLS module 61 in forwarding engine 45. In this way, VPLS module 61 may be programmed with associations between each PW and output interface and specific source customer MAC addresses reachable via those PWs. VPLS module 61 updates the one of MAC tables 60 associated with the VPLS to associate the customer MAC addresses with the appropriate outbound PW. In some examples, VPLS module 61 may maintain local MAC tables (not shown). After the update, the one of MAC tables 60 associated with this particular VPLS instance records associations between the PWs connected to router 40 that are used to transport L2 traffic to the MAC addresses of the customer devices within the VPLS sites of the VPLS instance. In other words, the one of MAC tables 60 for this VPLS instance records associations between the PWs and the network devices to which data packets may be sent on the PWs. For example, the one of MAC tables 60 records PW numbers that identify the PWs sourced by router 40, and for those PW numbers identifies the MAC addresses of the reachable customer devices within the VPLS instance.

VPLS module 61 receives data packets on inbound links 47 that are destined for one of the PE routers in the VPLS. VPLS module 61 determines whether the destination customer MAC address of the data packets is included in the one of MAC tables 60 associated with the VPLS. If the MAC address is included in the one of MAC tables, then router 40 forwards the data packets to the destination PE router on the PW associated with the MAC address based on forwarding information 55 associated with the VPLS. If the customer MAC address is not included in the one of MAC tables 60, flooding module 64 floods the data packets to all of the PE routers via the PWs based on forwarding information 55 associated with the VPLS. Example details of MAC learning by a router within a VPLS domain are further described in U.S. patent application Ser. No. 12/246,810, "INTER-AUTONOMOUS SYSTEM (AS) VIRTUAL PRIVATE LOCAL AREA NETWORK SERVICE (VPLS)," filed on Oct. 7, 2008, the entire contents of which are incorporated herein by reference.

Router 40 may also include a MAC interface module 66 that facilitates the techniques of this disclosure related to distributing the address space of a multi-homed VPLS site amongst a plurality of multi-homing routers, as described above. In some implementations, MAC interface module 66 may include one or more configurable rules or rule sets that define how a MAC interface is generated and implemented in router 40, and the MAC interface in turn may allow the "active-active" link topology amongst multi-homing routers in a VPLS.

In some implementations, MAC interface module 66 may instruct signaling module 49 to output control-plane messages to establish pseudowires that are external to the VPLS, e.g., the ingress and/or egress PWs described above. When a router joins the MAC domain with router 40, MAC interface module 66 may instruct signaling module 49 to signal a PW between router 40 and another multi-homing PE router to carry packets that have been received by router 40, but that are to be handled by the other multi-homing PE router according to the techniques described herein.

MAC interface module 66 may be used to process incoming packets to determine how the packets are to be forwarded by router 40. As one example of intake processing, MAC interface module 66 may inspect the packet header to identify the source MAC address and destination MAC address of the packet. MAC interface module 66 may also determine the classification of the packet, e.g., whether the packet is a known unicast packet, broadcast, unknown unicast, and multicast (BUM) traffic, or B/M traffic. In some implementations, MAC interface module 66 may also hash the packet header information across all of the multi-homing routers to determine whether the packet is to be handled by router 40 or by another one of the multi-homing routers. For example, MAC interface module 66 may perform a hash function on the source MAC address of the packet to obtain a hash value, and may map the packet to one of the mutually exclusive portions of the MAC domain corresponding to the responsible router based on the hash value. MAC interface module 66 may then determine a forwarding approach based on the classification of the packet and the portion of the MAC domain to which the packet corresponds.

As described above, if the receiving multi-homing router is responsible for forwarding the packet in the VPLS, then the receiving multi-homing router may forward the packet over one or more VPLS PWs, e.g., according to the routing information of router 40. If the receiving multi-homing router is not responsible for forwarding the packet in the VPLS, then the receiving multi-homing router may send the packet to the multi-homing router that is responsible for forwarding the packet, e.g., over one of the PWs external to the VPLS that was signaled as described above.

In some implementations, MAC interface module 66 may also generate the information to be included in TLVs that are included in BGP communications with the other multi-homing routers. For example, MAC interface module 66 may generate a message that notifies other routers that the router is configured to participate in an "active-active" link topology configuration with the other routers. MAC interface module 66 may also announce its support for the MAC interface using TLVs included in BGP communications with the other multi-homing routers. In some implementations, MAC interface module 66 may also provide information in TLVs related to the MAC domain division negotiations as described above.

The techniques described herein do not require modifications to BGP signaling for the VPLS. If a PE router configured as described herein encounters another PE router that does not support this feature, the configured PE router operates according to the conventional operation.

The architecture of router 40 illustrated in FIG. 2 is shown for exemplary purposes only. The disclosure is not limited to this architecture. In other embodiments, router 40 may be configured in a variety of ways. In one embodiment, for example, some of the functionally of routing engine 44 and forwarding engine 45 may be distributed within IFCs 46.

Elements of control unit 42 may be implemented solely in software, or hardware, or may be implemented as combinations of software, hardware, or firmware. For example, control unit 42 may include one or more processors, one or more microprocessors, digital signal processors (DSPs), application specific integrated circuits (ASICs), field programmable gate arrays (FPGAs), or any other equivalent integrated or discrete logic circuitry, or any combination thereof, which execute software instructions. In that case, the various software modules of control unit 42 may comprise executable instructions stored, embodied, or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of router 40, e.g., protocols. Control unit 42, in some examples, retrieves and executes the instructions from memory for these aspects.

Figure 3A:
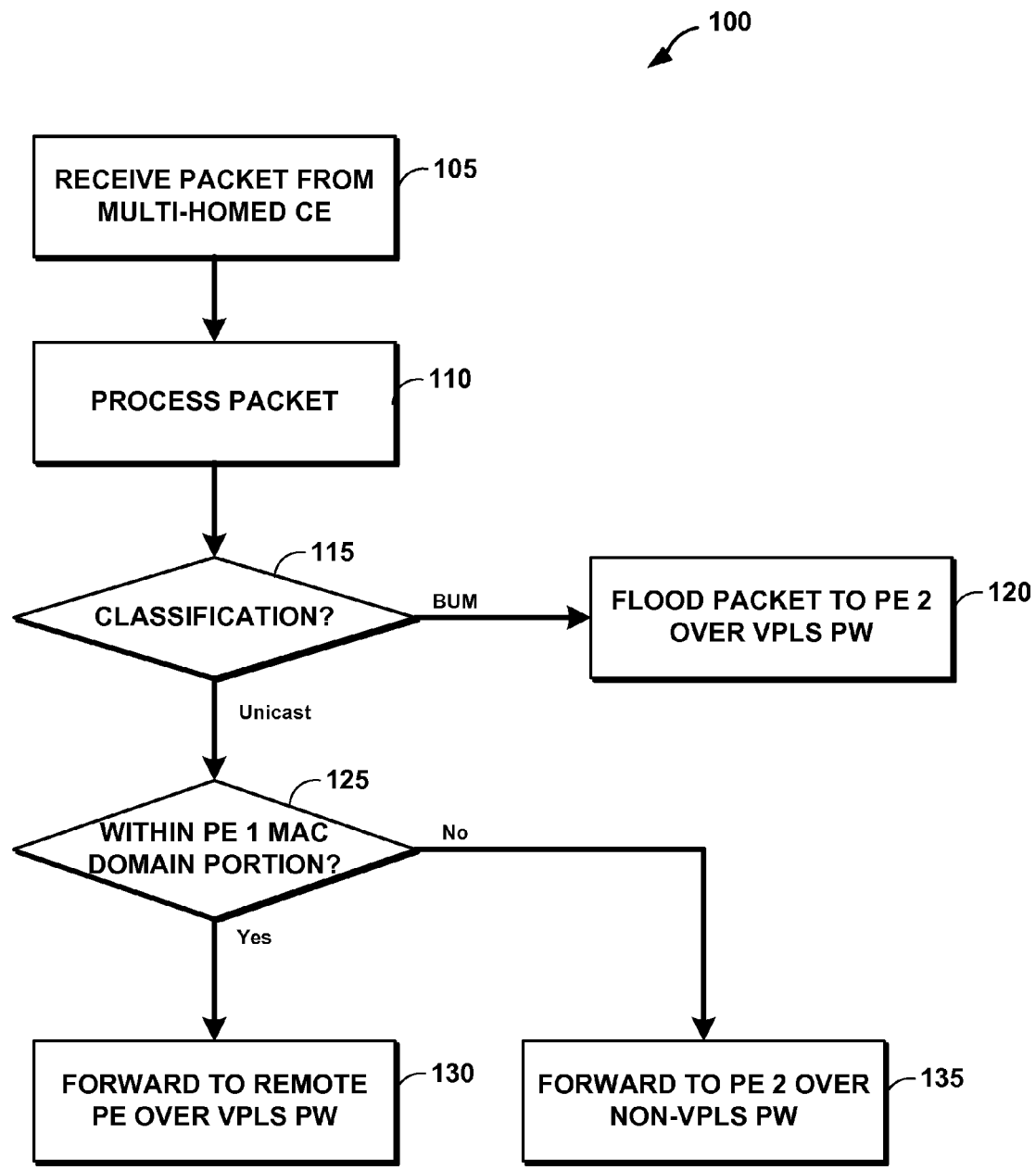
FIGS. 3A-3B are flow diagrams illustrating example operations of network devices consistent with techniques described in this disclosure.
Figure 3B:
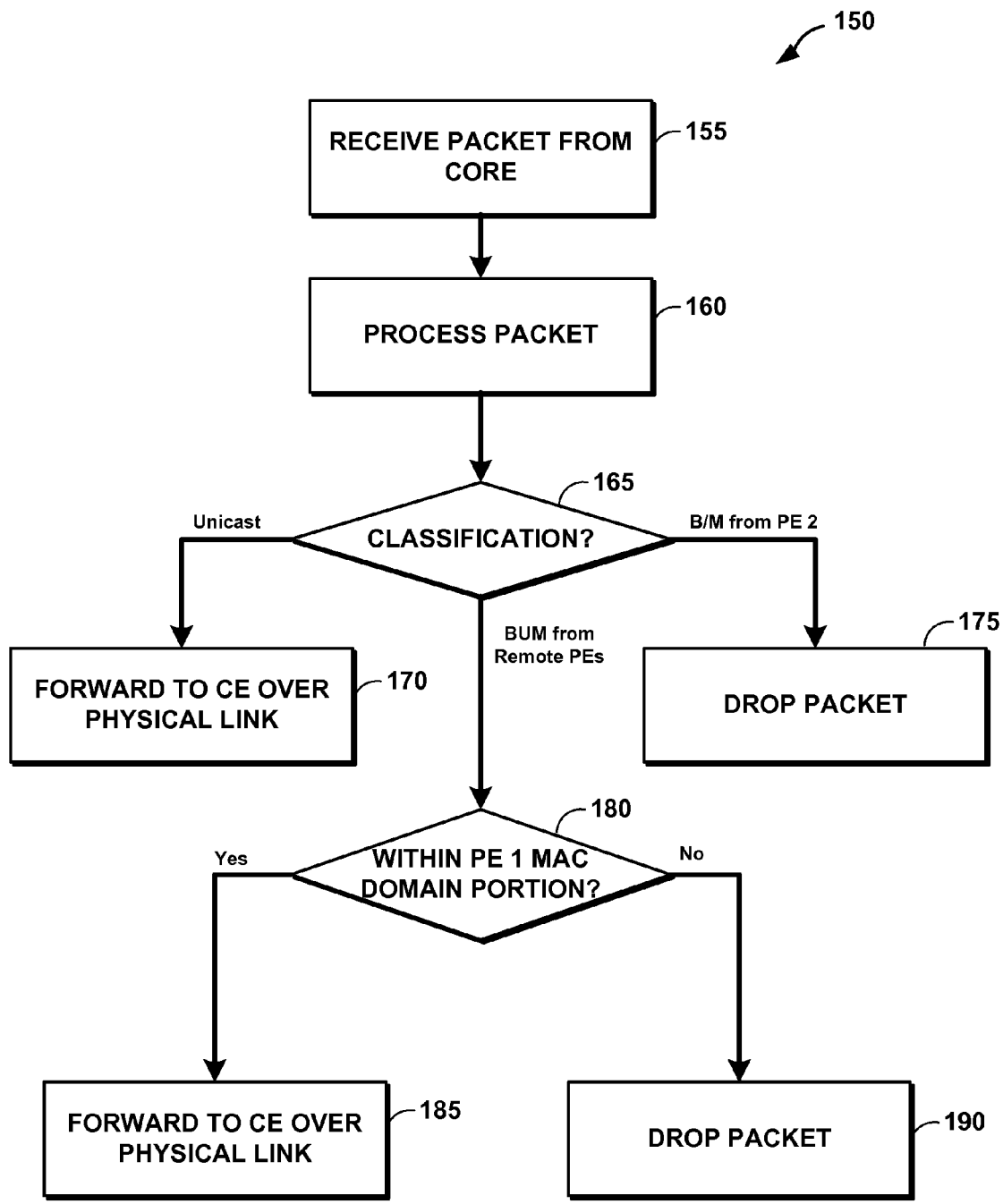

FIGS. 3A-3B are flow diagrams illustrating example operations of network devices consistent with techniques described in this disclosure. The operations shown in FIGS. 3A and 3B may be performed to determine appropriate handling of packets received by a multi-homing PE router that has divided the MAC domain of a VPLS site into two or more portions as described above. For illustrative purposes, the operations are discussed as being performed by a PE router, e.g., PE router 16A, in system 8 of FIG. 1. However, it should be understood that other routers or network devices may also implement the operations as shown.

In process 100 of FIG. 3A, a multi-homing PE router, e.g., PE router 16A, receives a packet from a multi-homed CE associated with a local VPLS customer site (105). For example, PE router 16A may receive the packet via a physical link 26A between CE router 18A and PE router 16A. Upon receiving the packet, PE router 16A may process the packet (110). In processing the packet, PE router 16A may perform any number of appropriate packet intake procedures. As one example of intake processing for the packet, PE router 16A may inspect the packet header to identify the source MAC address and destination MAC address of the packet. PE router 16A may also determine the classification of the packet, e.g., whether the packet is a known unicast packet, BUM traffic, or B/M traffic. In some implementations, PE router 16A may also hash the packet header information across all of the multi-homing PE routers to determine whether the packet is to be handled by PE router 16A or by another one of the multi-homing PE routers, e.g., PE router 16B. For example, PE router 16A may perform a hash function on the source MAC address of the packet to obtain a hash value, and may map the packet to one of the mutually exclusive portions corresponding to the responsible PE router based on the hash value.

PE router 16A may determine a forwarding approach based on the classification of the packet. For example, in process 100, if the packet is classified (115) as BUM traffic, the packet is flooded to PE router 16B over a VPLS PW established between PE router 16A and 16B (120). Such flooding may occur regardless of whether the packet is within a portion of the MAC domain associated with PE router 16A.

If the packet is classified (115) as known unicast traffic, then it is determined whether the source MAC address is in the portion of the MAC domain that PE router 16A is responsible for handling (125). If it is determined that the packet is within the MAC domain portion that PE router 16A is configured to handle, then PE router 16A forwards the packet to the remote customer site over a VPLS PW, e.g., VPLS PW 20B (130). If the packet is not within the MAC domain portion that PE router 16A is configured to handle, then PE router 16A forwards the packet over a non-VPLS PW to the PE router that is responsible for handling the associated portion of the MAC domain (135). For example, PE router 16A may determine that PE router 16B is responsible for handling network traffic that corresponds to the identified portion of the MAC domain, and PE router 16A may forward the packet to PE router 16B over PW 22, which is external to the VPLS domain. Then, PE router 16B may forward the packet to the VPLS cloud in accordance with forwarding protocols executing on PE router 16B.

Process 150 of FIG. 3B illustrates a similar procedure, except that the packet is received at PE router 16A from the core rather than from the local VPLS customer site. As such, process 150 begins when PE router 16A receives a packet from the core (155). Upon receiving the packet, PE router 16A may process the packet (160). In processing the packet, PE router 16A may perform any number of appropriate packet intake procedures. As one example of intake processing for the packet, PE router 16A may inspect the packet header to identify the source MAC address and destination MAC address of the packet. PE router 16A may also determine the classification of the packet, e.g., whether the packet is a known unicast packet, BUM traffic, or B/M traffic. In some implementations, PE router 16A may also hash the packet header information across all of the multi-homing PE routers to determine whether the packet is to be handled by PE router 16A or by another one of the multi-homing PE routers, e.g., PE router 16B.

PE router 16A may determine a forwarding approach based on the classification of the packet. For example, in process 150, if the packet is classified (165) as known unicast traffic, the packet is forwarded to the associated CE router, e.g., to CE router 18A over link 26A (170). In some implementations, when PE router 16A receives known unicast packets towards the MAC interface, the packets may be forwarded without MAC hashing to local VPLS site 14A. If the packet is classified (165) as B/M traffic received from a multi-homing PE router, e.g., PE router 16B, then PE router 16A may drop the packet (175). Dropping the B/M packets may prevent loop formation through the member links.

If the packet is classified (165) as BUM traffic received from a remote PE router, then it is determined whether the destination MAC address is in the portion of the MAC domain that PE router 16A is responsible for handling (180). If it is determined that the packet is within the MAC domain portion that PE router 16A is configured to handle, then PE router 16A forwards the packet to the local VPLS site via a physical link to the CE router 18A (185). If the BUM packet is not within the MAC domain portion that PE router 16A is configured to handle, then PE router 16A may drop the packet (190). Dropping the packet may ensure that only one copy of the BUM traffic is forwarded to the local CE router.

The forwarding rules described in processes 100 and 150 are examples provided for illustrative purposes only, and it should be understood that other forwarding rules may be implemented in system 8. While the above rules provide efficient routing of packets to and from a local multi-homed VPLS site via two or more multi-homing PE routers, other implementations may utilize different rules that are also consistent with the techniques described herein.

The MAC domain division techniques described above may be implemented in the context of a traditional VPLS, where only participating network devices are modified to execute the techniques described in this disclosure. As such, the techniques described above are backwards compatible with existing VPLS deployments.

However, it may also be desirable to modify the existing VPLS protocols in a manner that still provides backwards compatibility with existing VPLS deployments. Although the changes to existing VPLS protocols described below are not needed to implement the MAC domain division techniques discussed above, the two systems may coexist in a given VPLS deployment.

As described below, a modification to VPLS may allow ingress PE routers to control how network traffic is forwarded by egress PE routers that are configured in an "active-active" link topology. To accomplish such control, the ingress PE router may utilize additional labels that indicate the ingress and egress sites for network traffic when forwarding the traffic towards a PE router. The egress PE routers then forward the network traffic on the sites as dictated by the ingress PE router, independent of the egress PE router's view of the network topology and state.

The first label utilized by the ingress PE router is an egress bit vector label, which is used to determine the sites on the egress PE router should forward the traffic. The ingress PE router sets the label while forwarding the network traffic to the egress PE router in addition to a traditional PW label. Each bit in the bit vector label represents a site on the egress PE router. If a bit for a site is set, the egress PE router forwards the traffic to that site, regardless of the egress PE router's view of the network topology and state. In some implementations, the site to label mapping is determined by the egress PE router and advertised to the ingress PE router using BGP communications. For example, the egress PE router may add a TLV that defines its determined mapping to the site identifier advertisement in BGP.

The second label utilized by the ingress PE router is an ingress label, which is used to identify the site from which the traffic was received. In some implementations, a bit vector label in addition to the PW label can be used, where the specific bit for the site at ingress is set to indicate the site from which the traffic was received. The ingress label may be exchanged using BGP, and may allow the egress PE router to perform MAC learning per PW per site. In other implementations, the PE routers may utilize different PWs per site to forward the traffic, such that receipt or distribution over a particular PW identifies the traffic as having been received from a particular site.

As in the MAC division implementation described above, both of the links connecting a multi-homed site to the PE routers are marked as active. The multi-homed CE router may hash the traffic on both of the active links, and the ingress PE router may attach an ingress label based on the site that originated the traffic. In addition, an egress label may be attached to the traffic for each PW on which it is forwarded as detailed below.

In the case of known unicast traffic that was sent by a remote PE for whose destination there is a MAC entry in the MAC table, the ingress PE router determines the site associated with the MAC entry and the one or more PWs associated with this site. If the remote site is single homed or does not support an "active-active" link topology, there is only one PW or link per site per MAC. In such a case, the traffic is forwarded over this PW or link. If the remote site is multi-homed and supports an "active-active" link topology the site may be associated with a local link and multiple PWs. In such a case, an abstraction of a LAG per MAC per site may be used with the PWs and the local link as member links. Traffic may be hashed over the LAG, and each data packet may map over exactly one link or PW over which it will be forwarded. The bit vector label may be determined for the PW by setting the bit corresponding to the site with all others as zero.

In the case of BUM traffic that was sent by a remote PE router for whose destination there is no MAC entry in the MAC table, the ingress PE router floods the traffic to all single homed sites, designated sites for multi-homed VPLS sites that do not use an "active-active" link topology, and exactly one of the sites for multi-homed VPLS sites that use an "active-active" link topology. For each site, one of the PWs or the link is identified for forwarding the traffic. For each PW, a bit vector label is attached based on the destination set of sites. In some implementations, optimization techniques may be used to pre-determine the bit vector labels because the hashing is independent of the traffic and changes only when a site joins/leaves or changes its state to allow or disallow "active-active" link topology. Then, when a BUM packet is received by the ingress PE router, it is simply forwarded on all the PWs using the pre-determined bit vector labels.

When an egress PE router receives a packet over a PW from the ingress PE router, the egress PE router forwards the packet to all the sites for which the bits in the bit vector label have been set. In other words, the egress PE router routes the traffic according to instructions received from the ingress PE router, regardless of the egress PE router's view of the network topology and state.

This feature requires the multi-homed PE routers and the remote PE routers to be upgraded. However, the entire network need not be upgraded at once. PE routers that are not upgraded will continue to support VPLS without FRR and "active-active" link topology. This is because the forwarding path for data packets is as before if there is no bit vector label attached.

As with the MAC domain division techniques, the above described techniques may be deployed in a VPLS where only participating network devices, e.g., the multi-homed PE routers and the remote PE routers, are modified. In mixed environments including modified and non-modified PE routers, the forwarding path for network through non-modified PE routers may be unchanged because the non-modified PE routers may simply ignore the bit vector label and forward the traffic according to previous VPLS protocols. As such, the techniques described above are also backwards compatible with existing VPLS deployments.

Various embodiments have been described. These and other embodiments are within the scope of the following claims.

The invention claimed is:

1. A method comprising:
receiving, with a first provider edge (PE) router within a virtual private local area network service (VPLS) domain, a packet from a multi-homed VPLS customer site that is associated with the VPLS domain, the multi-homed VPLS customer site being coupled to the first PE router via a first active link and to a second PE router within the VPLS domain via a second active link, the packet being destined for a second VPLS customer site that is associated with the VPLS domain;
processing the packet to determine a portion of a media access control (MAC) domain to which the packet corresponds based on a source MAC address of the packet, wherein the MAC domain is associated with the multi-homed VPLS customer site and includes MAC addresses of network devices within the multi-homed VPLS customer site, and wherein the MAC domain is divided into mutually exclusive portions amongst the first PE router and the second PE router such that the first PE router is configured to forward network traffic sent from a first portion of the MAC domain and the second PE router is configured to forward network traffic sent from a second portion of the MAC domain;
when the packet is determined to correspond to the first portion of the MAC domain, forwarding the packet from the first PE router to the second VPLS customer site in accordance with forwarding protocols executing on the first PE router; and
when the packet is determined to correspond to the second portion of the MAC domain, forwarding the packet from the first PE router to the second PE router via a pseudowire that is external to the VPLS domain such that the second PE router forwards the packet to the second VPLS customer site in accordance with forwarding protocols executing on the second PE router.

2. The method of claim 1, wherein processing the packet comprises performing a hash function on the source MAC address of the packet to obtain a hash value, and mapping the packet to one of the mutually exclusive portions based on the hash value.

3. The method of claim 1, wherein the multi-homed VPLS customer site is coupled to a third PE router within the VPLS domain via a third active link, and wherein the MAC domain is divided amongst the first PE router, the second PE router, and the third PE router such that the third PE router is configured to forward network traffic sent from a third portion of the MAC domain.

4. The method of claim 1, wherein the first PE router and the second PE router negotiate the division of the MAC domain using one or more type-length-value (TLV) fields of a border gateway protocol (BGP) communication.

5. The method of claim 1, wherein the MAC domain is divided into portions of substantially equal size.

6. The method of claim 1, wherein the MAC domain is divided into portions of substantially unequal size.

7. A method comprising:
receiving, with a first provider edge (PE) router within a virtual private local area network service (VPLS) domain, a packet from a remote VPLS customer site that is associated with the VPLS domain, the packet being destined for a multi-homed VPLS customer site that is associated with the VPLS domain, the multi-homed VPLS customer site being coupled to the first PE router via a first active link and to a second PE router within the VPLS domain via a second active link;
processing the packet to determine a portion of a media access control (MAC) domain to which the packet corresponds based on a destination MAC address of the packet, wherein the MAC domain is associated with the multi-homed VPLS customer site and includes MAC addresses of network devices within the multi-homed VPLS customer site, and wherein the MAC domain is divided into mutually exclusive portions amongst the first PE router and the second PE router such that the first PE router is configured to forward network traffic destined for a first portion of the MAC domain and the second PE router is configured to forward network traffic destined for a second portion of the MAC domain; and
when the packet is determined to correspond to the first portion of the MAC domain, forwarding the packet from the first PE router to the multi-homed VPLS customer site in accordance with forwarding protocols executing on the first PE router, and
when the packet is determined to correspond to the second portion of the MAC domain, forwarding the packet from the first PE router to the second PE router via a pseudowire that is external to the VPLS domain such that the second PE router forwards the packet to the multi-homed VPLS customer site in accordance with forwarding protocols executing on the second PE router.

8. The method of claim 7, wherein processing the packet comprises performing a hash function on the destination MAC address of the packet to obtain a hash value, and mapping the packet to one of the mutually exclusive portions based on the hash value.

9. The method of claim 7, wherein the multi-homed VPLS customer site is coupled to a third PE router within the VPLS domain via a third active link, and wherein the MAC domain is divided amongst the first PE router, the second PE router, and the third PE router such that the third PE router is configured to forward network traffic destined for a third portion of the MAC domain.

10. The method of claim 7, wherein the first PE router and the second PE router negotiate the division of the MAC domain using one or more type-length-value (TLV) fields of a border gateway protocol (BGP) communication.

11. The method of claim 7, further comprising establishing a MAC interface within the second PE router that bundles the second active link with the pseudowire that is external to the VPLS domain.

12. A router comprising:
an interface configured to receive a packet from a multi-homed virtual private local area network service (VPLS) customer site, the packet being destined for a second VPLS customer site;

a routing engine configured to process the packet to determine a portion of a media access control (MAC) domain to which the packet corresponds based on a source MAC address of the packet, and to establish a pseudowire that is external to the VPLS between the router and a second router, wherein the router and the second router are both associated with the multi-homed VPLS customer site and coupled to the multi-homed VPLS customer site via active links; and a forwarding engine configured to forward the packet from the router to the second VPLS customer site in accordance with forwarding protocols executing on the router when the packet is determined to correspond to a first portion of the MAC domain, and to forward the packet to the second router via the pseudowire that is external to the VPLS such that the second router forwards the packet to the second VPLS customer site in accordance with forwarding protocols executing on the second router when the packet is determined to correspond to a second portion of the MAC domain.

13. The router of claim 12, wherein processing the packet comprises performing a hash function on the source MAC address of the packet to obtain a hash value, and mapping the packet to one of the portions of the MAC domain based on the hash value.

14. The router of claim 12, wherein the multi-homed VPLS customer site is coupled to a third router via an active link, and wherein the MAC domain is divided amongst the router, the second router, and the third router such that the third router is configured to forward network traffic sent from a third portion of the MAC domain.

15. The router of claim 12, wherein the router and the second router negotiate division of the MAC domain using one or more type-length-value (TLV) fields of a border gateway protocol (BGP) communication.

16. The router of claim 12, wherein the MAC domain is divided into portions of substantially equal size.

17. The router of claim 12, wherein the MAC domain is divided into portions of substantially unequal size.

18. A router comprising:
an interface configured to receive a packet from a remote virtual private local area network service (VPLS) customer site, the packet being destined for a multi-homed VPLS customer site;

a routing engine configured to process the packet to determine a first portion of a media access control (MAC) domain to which the packet corresponds based on a destination MAC address of the packet, and to establish a pseudowire that is external to the VPLS between the router and a second router, wherein the router and the second router are both associated with the multi-homed VPLS customer site and coupled to the multi-homed VPLS customer site via active links; and a forwarding engine configured to forward the packet from the router to the multi-homed VPLS customer site in accordance with forwarding protocols executing on the router when the packet is determined to correspond to the first portion of the MAC domain, and to forward the packet to the second router via the pseudowire that is external to the VPLS such that the second router forwards the packet to the multi-homed VPLS customer site in accordance with forwarding protocols executing on the second router when the packet is determined to correspond to a second portion of the MAC domain.

19. The router of claim 18, wherein processing the packet comprises performing a hash function on the source MAC address of the packet to obtain a hash value, and mapping the packet to one of the portions of the MAC domain based on the hash value.

20. The router of claim 18, wherein the multi-homed VPLS customer site is coupled to a third router via an active link, and wherein the MAC domain is divided amongst the router, the second router, and the third router such that the third router is configured to forward network traffic sent from a third portion of the MAC domain.

21. The router of claim 18, wherein the router and the second router negotiate division of the MAC domain using one or more type-length-value (TLV) fields of a border gateway protocol (BGP) communication.

22. The router of claim 18, wherein the MAC domain is divided into portions of substantially equal size.

23. The router of claim 18, wherein the MAC domain is divided into portions of substantially unequal size.

* * * * *